(12) United States Patent
Pabsch et al.

(10) Patent No.: US 6,257,858 B1
(45) Date of Patent: Jul. 10, 2001

(54) APPARATUS FOR MAKING COMPONENTS OF LARGE AREA BY RTM

(75) Inventors: Arno Pabsch; Christof Sigle; Matthias Piening, all of Braunschweig (DE)

(73) Assignee: Deutsches Zentrum fur Luft-und Raumfahrt e.V., Cologne (DE)

( * ) Notice: Subject to any disclaimer, the term of this patent is extended or adjusted under 35 U.S.C. 154(b) by 0 days.

(21) Appl. No.: 09/043,977

(22) PCT Filed: Sep. 26, 1996

(86) PCT No.: PCT/EP96/04213

§ 371 Date: Jun. 19, 1998

§ 102(e) Date: Jun. 19, 1998

(87) PCT Pub. No.: WO97/12754

PCT Pub. Date: Apr. 10, 1997

(30) Foreign Application Priority Data

Sep. 30, 1995 (DE) .............................. 195 36 675

(51) Int. Cl.[7] .................................................. B29C 70/44
(52) U.S. Cl. .................... 425/129.1; 264/571; 425/389
(58) Field of Search .................... 425/389, 390, 425/112, 129.1; 264/571

(56) References Cited

U.S. PATENT DOCUMENTS

| | | | |
|---|---|---|---|
| 2,913,036 | 11/1959 | Smith | 264/102 |
| 4,902,215 | 2/1990 | Seemann, III | 425/389 |
| 4,942,013 | 7/1990 | Palmer et al. | 264/571 |
| 5,015,168 | * 5/1991 | Boime et al. | 425/389 |
| 5,152,949 | * 10/1992 | Leoni et al. | 425/389 |
| 5,316,462 | 5/1994 | Seeman | 425/389 |
| 5,368,807 | * 11/1994 | Lindsay | 425/389 |
| 5,382,150 | * 1/1995 | Henrio | 425/390 |
| 5,403,537 | * 4/1995 | Seal et al. | 264/571 |
| 5,439,635 | * 8/1995 | Seemann | 425/389 |
| 5,593,633 | * 1/1997 | Dull et al. | 425/389 |

FOREIGN PATENT DOCUMENTS

| | | | |
|---|---|---|---|
| 63-183831 | * 7/1988 | (JP) | 425/389 |
| 3-162933 | * 7/1991 | (JP) | 264/571 |

* cited by examiner

*Primary Examiner*—Robert Davis
(74) *Attorney, Agent, or Firm*—Salter & Michaelson

(57) ABSTRACT

In a process for producing large-surface structural elements from fiber-reinforced composite materials by resin transfer moulding, a mold (2) that can be evacuated has a dimensionally stable part (4) and an elastically deformable part (6). The mold (2) has connections for injecting a resin mixture and connections to a pressure sink. A fibrous fabric (12) is set into the mold (2). Elongated pipes having a large supporting surface (22) and a cavity (24) that extends in the longitudinal direction of the pipes above the supporting surface (22) are provided on the surface of the fibrous fabric (12) opposite to the dimensionally stable mold part (4) to inject the resin mixture and to ensure the connection with the pressure sink. The supporting surface (22) of the pipes has a narrow slit (26) which extends substantially over the whole length of the pipes and which is in communication over its whole length with the cavity (24). At least one end of the pipes extends outwards through the edges of the elastically deformable and dimensionally stable mold parts and is linked to the resin supply pipe or to the pressure sink. The mold (2) is evacuated down to an inner pressure of less than 50 hPa.

12 Claims, 4 Drawing Sheets

APPARATUS FOR MAKING COMPONENTS OF LARGE AREA BY RTM

The invention relates to an apparatus and a method of making large-area components from fibre composites by injecting a resin mixture into a mould with interacting mould elements between which the preformed fibre layers are inserted, one element being resiliently deformable and the other dimensionally stable, the two elements being joinable in vacuum-tight manner at their edges, wherein the mould is provided with connections for means for injecting the resin mixture and a negative pressure source for lowering the internal pressure of the mould chamber below atmospheric, and wherein an external pressure above atmospheric is applied to the closed mould in a pressure vessel from all sides, and the resin mixture is injected into the mould at a pressure and until cured is kept at a pressure which is lower than the external pressure acting on the mould by a difference determining the volumetric fibre content of the component.

Processes of this type are also described as RTM (resin transfer moulding) processes.

Horst Wurtinger's article on "Impregnating methods for making large-area fibreglass/plastic components" in the journal "Kunststoffe", volume 54 (1964) number 12, pages 797 to 803, describes a mould in which the connections for the means for injecting the resin mixture and the negative pressure source are arranged in the dimensionally stable mould member, in fact at opposing edges of the dimensionally stable mould member, and respective elongated grooves are arranged on the inside of that member, into which the connections discharge and which are used for uniform transverse spreading of the resin at both sides of the connections. Thus the resin, spread on both sides of the connection by the groove, is said to flow through the fibre layers, advancing in a front parallel with the groove. These grooves form on the surface as linear projections which have to be removed by abrasion.

Another article by Horst Wurtinger on "Production of large-area fibreglass/plastic parts by an injection process" in the journal "Kunststoff-Rundschau", volume 9 (September 1970), pages 475 to 479, gives a pressure of 200 torr (corresponding to 270 hPa) as the lower limit for working at low air pressure in the mould, on the grounds that any further lowering of pressure leads to foaming of the resin and excessive bubble formation in the laminate.

U.S. Pat. Nos. 5,316,462 and 5,439,635 show another conventional version of the RTM process. Here the apparatuses work with sub-atmospheric against atmospheric pressure to make fibre-reinforced composite materials, i.e. without external pressure being applied separately. They have feed pipe elements and a strongly structured interior of the apparatus, which is juxtaposed with the composite to be formed. This structure, forming intersecting channels, improves the resin spreading. In this conventional version of the RTM process the resin flows through the fibre layers at right angles. For this purpose it is necessary and helpful first to spread the resin as evenly as possible over the whole available area before the first fibre layer, in order to obtain a uniform flow in all zones. Complicated shapes cannot be made in this way and there is always a danger of inclusions, shrinkage and uncontrolled flow directions in the resin. The resin advances along a ragged front and there is a very wide contact area from the resin to the sub-atmospheric pressure or vacuum region. The resin also overshoots the last fibre layer uncontrollably. The first and last fibre layer are extremely rough and have to be pulled off and/or smoothed as a general rule.

The above-mentioned advanced version of the RTM process operates with differential pressures as theoretically proposed by Wurtinger. Consequently the resin can flow parallel with the fibre layers rather than at right angles. This makes the front along which it advances small and clearly defined. It is unnecessary and in fact undesirable to spread the resin before it flows in. The problem with the very low sub-atmospheric pressures theoretically proposed by Wurtinger is however that, although these are desirable for large moulds with complex divisions, bubbling and foaming of the resin again occur at the contact zones and, although the inflow areas are small, trouble spots appear.

The problem of the invention is to develop the above-mentioned apparatus and the above-mentioned method further, so that even very large components can be made, e.g. wing shells for aircraft, of a great length of up to 25 m and more and with large volumes of fibre, including those provided with rib-like projections on the inside such as stringers and rib supports.

According to the invention the problem is solved in an apparatus, in that pipe elements, lying on the surface of the fibre layer arrangement opposite the dimensionally stable mould member, are provided for injection of the resin mixture and connection to the negative pressure source, the pipe elements having a length of the same order as the length or width of the large-area components and having a wide-area bearing surface, being provided with a cavity extending longitudinally of them above the bearing surface and being provided with a narrow slot in the bearing surface, which slot extends substantially over the whole length of the pipe element and is connected to the cavity along its length, the width of the slot being narrower than the diameter of the cavity.

The problem is solved in a method, in that the resin mixture on the surface of the fibre layer arrangement opposite the dimensionally stable mould member is injected by means of a linear gate from an elongated slot in a pipe element, the length of which is of the same order as the length or width of the large-area components, and a connection to the negative pressure source is provided by an elongated slot in another pipe element. the width of the slot being narrower than the diameter of a cavity in the pipe element.

Preferred embodiments are the subject of the other claims.

A special advantage of the method of the invention and the apparatus of the invention is that the dimensionally stable mould member, which determines the external surface, may be constructed without connections firstly to the means for injecting the resin mixture and secondly to the negative pressure source, so that no sprues form, and that the resiliently deformable mould member may also be constructed without such connections. When the resin mixture has cured the pipe elements are joined to the component by narrow stalks, which are broken off in the immediate vicinity of the surface of the component during removal of the pipe elements.

An embodiment of the invention is illustrated in the accompanying drawings and described below with reference to them. In the drawings.

Figure 1:
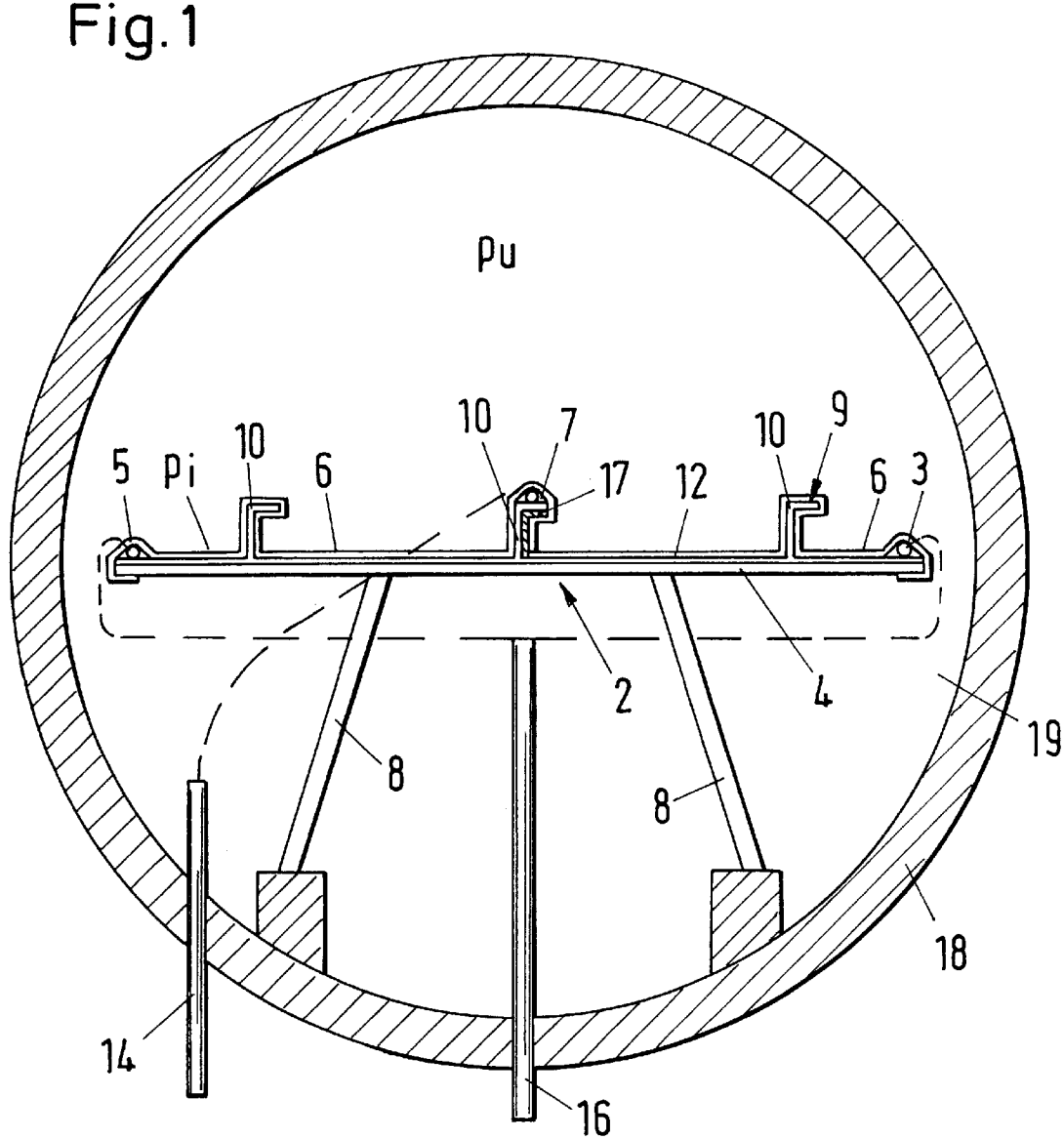
FIG. 1 illustrates the principle of the method, by showing a cross-section through an autoclave with a mould inserted therein.

The mould 2 shown in FIG. 1 has a dimensionally stable member 4 and a resiliently deformable member 6. The member 4 may comprise a metal sheet shaped to match the profile of the external surface of a component to be produced; it is given its dimensional stability by supports or bearings 8 and may also be provided with ribs to increase such stability. The means providing the dimensional stability may be stuck on and stuck together, as they need only absorb weak forces. The surface quality of the member 4 determines the surface quality of the component.

The resiliently deformable mould member 6 and the dimensionally stable mould member 4 may be joined at the edges in vacuum-tight manner. Here the member 6 is shown engaging over and under the member 4. The edge region may be sealed by a sealing or adhesive strip. In the simplest case the member 6 may be a plastic sheet cut to fit the outer periphery of the dimensionally-stable member 4; it may be sealed on the surface of the member with sealing or adhesive strip as illustrated e.g. in FIG. 4.

High surface quality is normally required on the outside of the surface for structures of large area such as shells of aircraft components, but also for vehicle body components. The surface is normally free of any serious flaws in its profile. If the back is also free of protrusions a smooth sheet of appropriate strength is adequate as the resiliently deformable mould member 6.

The fibre layer, which is laid out according to the required strength properties of a component 9, may be pre-fabricated as a fibre layer arrangement 12. It is placed on the dimensionally stable member 4 then covered with the resilient member 6, the exposed edge of which is joined to the dimensionally stable member 4 in vacuum-tight manner.

In the embodiment the component 9 is shown with spaced stiffening ribs 10. In the region of a protrusion such as the ribs 10 shown or rib intersections the resiliently deformable member 6 may be pre-shaped with a depression corresponding to the profile of such a rib 10 or rib intersection. Such pre-shaped parts of the mould member 6 may alternatively be made separately then joined to each other or joined by sheet sections or other intermediate elements, being for example stuck together or vulcanised to, onto or into the other piece.

In components 9 with protrusions such as the ribs 10 illustrated it may be advantageous to place the fibre layer arrangement 12 on the deformable mould member 6 in which preformed depressions have to be made for the protrusions. It is then easier to insert the parts of the arrangement 12 intended for the ribs 10 in the appropriate moulded depressions; the mould member 4 is then placed on the arrangement 12.

Three elongated pipe elements 3, 5 and 7 are arranged in the mould 2 shown in FIG. 1, of which the elements 3 and 5 may be connected to a vacuum pipe 14 and the element 7 to an injection pipe 16. The prepared mould is placed in a pressure vessel 18, the wall of which is provided with passages or connections for the vacuum pipe 14 and resin-injection pipe 16. The mould chamber between the members 4 and 6 is evacuated through the pipe 14. Evacuation or possibly partial evacuation of the mould 2 before the closed mould is placed in the pressure vessel 18 ensures that the fibre layer arrangement 12 and member 6 are firmly applied to the member 4.

When the mould 2 has been placed in the pressure vessel 18 the vessel is closed and the final vacuum is formed in the mould; it must be less than 50 hPa (preferably between 10 and 1 hPa), i.e. equivalent to an industrial vacuum. A pressure $p_u$, which should be of the order of 0.3 to 1.0 MPa, preferably about 0.6 MPa, is built up in the pressure chamber 19; a $p_u$=0.6 MPa=6 000 hPa=6 bar thus corresponds to the permissible internal pressure of large autoclaves as used in the air travel industry. When the final pressure has been reached, i.e. when the interior of the mould has been completely evacuated, a reactive resin mixture is injected through the pipe 16 at a pressure $p_1$ lower than the external pressure $p_u$ in the pressure vessel, and completely fills the mould 2. The mould is completely de-aerated through the vacuum present in it, thus avoiding the formation of air pockets when the resin is injected. The vacuum pipe 14 should desirably be arranged so that the flow front of resin reaches it last.

Hardener may be de-gassed in the vacuum at the exposed surface of the flow front, where only the vacuum acts on the resin-hardener mixture. However this is largely avoided by the strict demarcation imposed by the process between the vacuum region and the above-atmospheric pressure in the resin flow region. The small quantities obtained are discharged and flushed out through the vacuum pipe.

Generally speaking the situation is as follows:

In the method of the invention the injection pressure $p_1$ has to be kept below the external or ambient pressure $p_u$. The requirement is thus that $$p_u > p_1.$$

volumetric fibre content is a function of the pressure difference $dp = p_u - p_1$. The relationship between the volumetric fibre content $V_F$ and the pressure difference $dp$ can easily be ascertained from the stiffness of the fibre layer arrangement 12. For this purpose the arrangement 12 is inserted between two parallel clamping plates. When the plates are moved together, thus compressing the arrangement 12, the thickness of the layer can be determined as a function of the compressive force.

The situation is then that $$dp = F/(A_d)$$

with $dp$ (Pa), force F (N) and $A_d$ (m$^2$).

The volumetric fibre content $V_F$ of the component can be ascertained from the compression dimension $d_d$, the number n of fabric layers, the weight per unit area $F_F$ of the fibre material and the density p of the fibres, by the formula $$V_F = F_F \cdot n / (\rho_F \cdot d_d)$$

with $F_F$ (kg/m$^2$), $\rho_F$ (kg/m$^3$) and $d_d$ (m).

It follows that the volumetric fibre content $V_F$ is obtained as a function of the pressure difference $dp$ between the internal pressure $p_1$ and the external pressure $p_u$.

In the manufacture of a fibre composite component the necessary pressure difference $dp$, which must prevail when the resin begins to cure, can thus be determined for the respective volumetric fibre content.

The required pressure difference must be kept independent of the external pressure. It follows that the injection pressure $p_1$ can be raised by raising the external pressure. The component filling time is dependent on the injection pressure $p_1$. The higher the injection pressure, the shorter the time, as expressed in the following formula:

$$V/A = -K \Delta \rho / \eta \Delta l$$

V: flow, by volume, A: area flowed through, K: permeability, η: viscosity, Δp: pressure difference and Δ|: distance apart.

The permeability K of the fibre layers can be determined by measuring the pressure loss.

Figure 2:
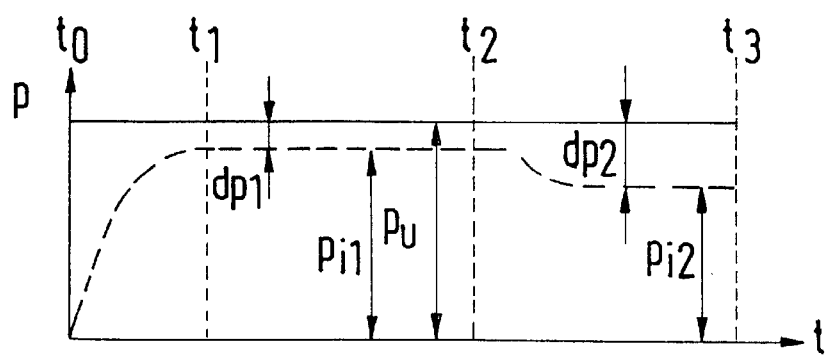
FIG. 2 is a graph showing the injection pressure, plotted against the injection time.

Pressure variation during injection is illustrated by a graph in FIG. 2. The injection time t is plotted on the abscissa and the pressure p on the ordinate. The ambient pressure $p_u$ is constant and represented by a continuous line, while the current injection pressure is represented by a broken-line curve.

The external pressure $p_u$ is applied to the mould. From time $t_0$, the beginning of resin injection, to time $t_1$ the pressure in the mould 2 rises to the injection pressure $p_{i1}$, which is lower than the external pressure $p_u$. The internal pressure $dp_{i1}$ thus then has a $dp_1$ from the external pressure $p_u$. The pressure difference $dp_1$ must be chosen so that $p_{i1}$ does not reach the ambient pressure $p_u$. At a given $p_u$ a small $dp_1$ leads to high flow speeds for the injected resin and thus to rapid filling of the mould. Combined with low viscosity η of the resin mixture, which helps to raise the flow speed, a highly reactive resin mixture can thus be used.

At time $t_2$ the component is fully impregnated with resin. The injection pressure can then be lowered to a level $p_{i2}$ corresponding to the desired volumetric fibre content $V_F$, as explained in the introductory remarks. The injected resin cures with differential pressure $dp_2$ thereby lowered.

If the pressure $p_{i2}$ is kept constant the desired volumetric fibre content may also be adjusted by raising the external pressure $p_u$.

The method may also be carried out with the injection pressure $p_1$ and simultaneously the external pressure $p_u$ being lowered after the filling of the mould, and with the $dp_2$ being maintained so long as the resin mixture is still in the liquid phase.

When the fibre layer arrangement 12 in the FIG. 1 embodiment of the mould 2 and component 9 is being made up, a fibre strip for the fibre composite of the rib 10 is placed on the flat fibre layer and fixed on the flat fibre layer part by pinning, sewing or the like. Similarly a plurality of superimposed fibre layers can be made up to form the arrangement 12.

The fibre reinforcement in the rib region is inserted in the appropriately pre-shaped section of the resiliently deformable mould member 6. Here the process may be assisted e.g. by inserting metallic angular straps 17 in the depression together with the fibre strips, the straps acting as additional mould-stabilising elements. Such straps 17 may be inserted loose, or may be fixed to the resilient member 6 so that they can follow its movements.

If recesses have to be provided in a substantially flat component 9 or a component with large radii of curvature, such as handle recesses in the door of a vehicle, a corresponding negative of such a recess may be attached, e.g. stuck, to the surface of the dimensionally stable member 4. The corresponding wall thickness is automatically adjusted to the thickness in the other regions through the resilient deformability of the opposing member 6.

Owing to the substantially isostatic load the resiliently deformable member 6 also produces a smooth surface on the component 9.

The fibre layer arrangement 12 of the component 9 may be made up before insertion in the mould 2 and may be placed in the mould dry. When the mould has been closed the arrangement is held in position therein by the external pressure created by the vacuum. As the fibres are compressed at the full external pressure $p_u$ before injection begins they are fixed in the mould, and there is no fibre displacement in the mould 2 when the resin mixture is injected, even at high injection speeds and if the fibre layers at first have low permeability and thus high resistance to flow through them during the period $t_0$ to $t_1$. An optimum compromise between a high flow speed and adequate fibre fixing can be found by adjusting $dp_1$.

If an autoclave is used as the pressure vessel 18 the resin mixture in the mould 2 may be cured more rapidly by the thermal action. It is also possible to inject the resin mixture pre-heated, thereby simultaneously reducing its viscosity, which partly determines the flow speed, and the time required for curing.

It is of course also possible to use the method of the invention for making three-dimensional components 9, with the fibre arranged on a shaping foam core, preferably with closed pores.

The dimensionally stable mould member 4 may as already mentioned be made of a metal sheet. In more complex structures however that member may be formed by a fibre-reinforced plastic moulded e.g. from a sample of the component/workpiece.

In components 9 of large area, particularly very long ones, the dimensionally stable member may alternatively be made up of a plurality of individual elements fixed adjacent each other on a supporting framework. The joints are loaded substantially only by the weight of the mould 2 and component 9, and simple adhesive joints are therefore sufficient. Butt joints between shaping members 4 can easily be sealed with sealing or adhesive tapes.

The resiliently deformable member 6, which generally models the complex structures of the component 9, may be made of an elasto-polymeric material, preferably a material which cannot be wetted by the resin mixture, for example silicone rubber. Regions of more complex structure, e.g. ribs and stringers and particularly intersection points of protrusions, may be made as separate mould elements then joined to flat sheets or resilient plates of appropriate elastomers e.g. by vulcanisation. Cost-effective production of the resilient member 6 is thus possible, even for making components of complex structure.

Figure 3:
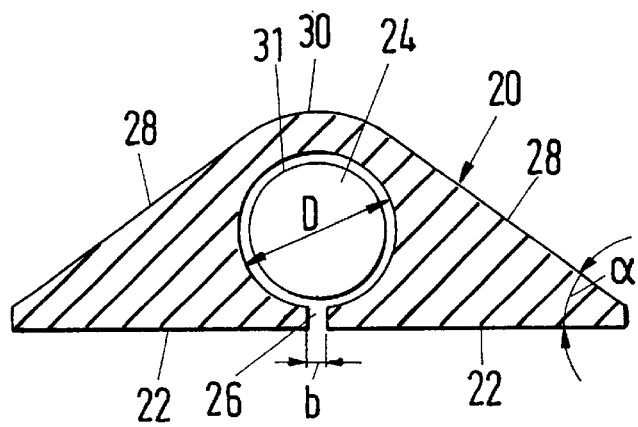
FIG. 3 is a cross-section through a pipe element.

The construction of the pipe elements 3, 5 and 7 shown in FIG. 1 is essential to the method of the invention. The pipes are similar to each other. One such element—referred to here and hereinafter as 20—is shown in cross-section in FIG. 3. The pipe element 20 has a bearing surface 22 of wide area. A cavity 24 extending longitudinally of the pipe element is formed above the surface 22 and connected to it by a narrow slot 26. The slot 26 preferably has a width b of approximately 1 mm. The diameter D of the cavity 24 may be approximately between 8 and 10 mm. The back of the pipe element 20 has two shoulders 28 at a small angle of inclination α to the bearing surface 22. The two shoulders 28 merge into a rounded section 30 above the cavity 24.

The pipe element 20 is made of a resilient material, preferably silicone rubber. It can therefore adapt itself to the surface of the fibre layer arrangement 12 and also twist in a longitudinal direction under the pressure $p_u$. It may also be bent in a transverse direction. To obtain the cross-section of the cavity 24, a wire helix 31 loosely applied to the wall thereof is provided in the cavity as a supporting member; it can be inserted in and taken out of the cavity simply by bending open the pipe elements 20.

The pipe element 20 is very long, and at least two pipe elements are inserted in the mould 2 so that they run in the same direction and are as far as possible at a uniform spacing or a spacing with no substantial variation along their length. As far as possible they must extend in the direction of the longest side of the mould.

Figure 4:
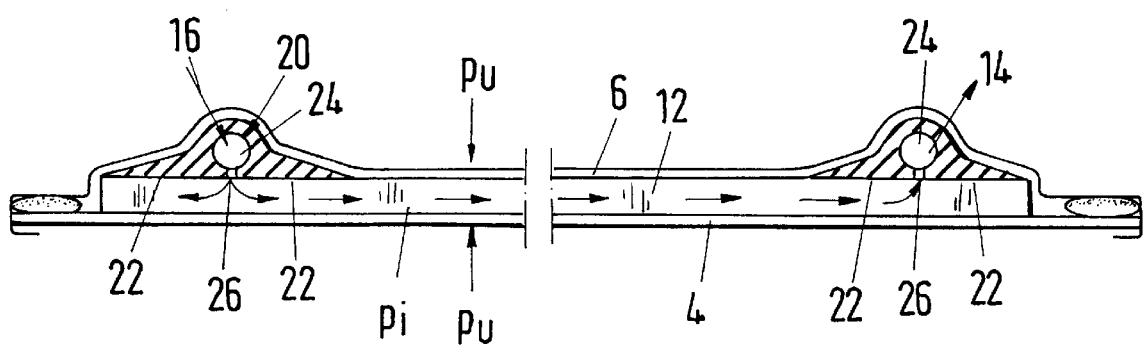
FIG. 4 is a cross-section through a simple shell.

Such an arrangement is represented diagrammatically in FIG. 4. The dimensionally stable member 4, the maximum length of which is assumed to be perpendicular to the plane of the drawing, has the fibre layer arrangement 12 lying on it, shown here as a flat fibre layer. At the edges of the arrangement 12, preferably the edges with the maximum length, a pipe element 20 is placed on the arrangement 12 in each case, with its bearing surface 22 lying on top of the arrangement 12. The arrangement 12 and pipe elements 20 are covered by the resilient mould member 6. The pipe elements 2 are preferably taken out at one end between the dimensionally stable member 4 and the resilient member 6 and sealed off from those members.

In the mould in FIG. 4 the right-hand pipe element 20 is joined to a negative pressure source producing the vacuum (vacuum pipe 14), while the left-hand element is coupled to the injection pipe 16.

When the industrial vacuum has been created in the mould 2 the resin is injected at a pressure $p_1$ which is $dp_1$ lower than the external pressure $p_u$. The resin then flows through the fibre layer arrangement 12 as shown by the arrows in the drawing and fills the whole mould 2 without forming any air pockets, owing to the industrial vacuum prevailing in the mould. By virtue of the vacuum inside the mould, even fibre inserts provided to form the rib-like protrusions shown in FIG. 1 (ribs 10) are impregnated without any problem, as are the parts of the arrangement 12 located between the slot 26 of the pipe elements 20 and the edge of the arrangement 12 spaced therefrom.

The number of pipe elements 20 which are parallel or which extend in the same direction is established according to the particular requirements. In quite a wide component 9, for example, an additional pipe element connected to the injection pipe 16 might be provided to the right of the element connected to the vacuum, at the same spacing as the left-hand pipe element. It is essential that injection pipes 16 should always alternate with vacuum pipes 14, to ensure a cross-flow between the pipe elements. The distance between the vacuum pipes 14 and injection pipes 16 determines inter alia the filling time of the mould 2.

Figure 5:
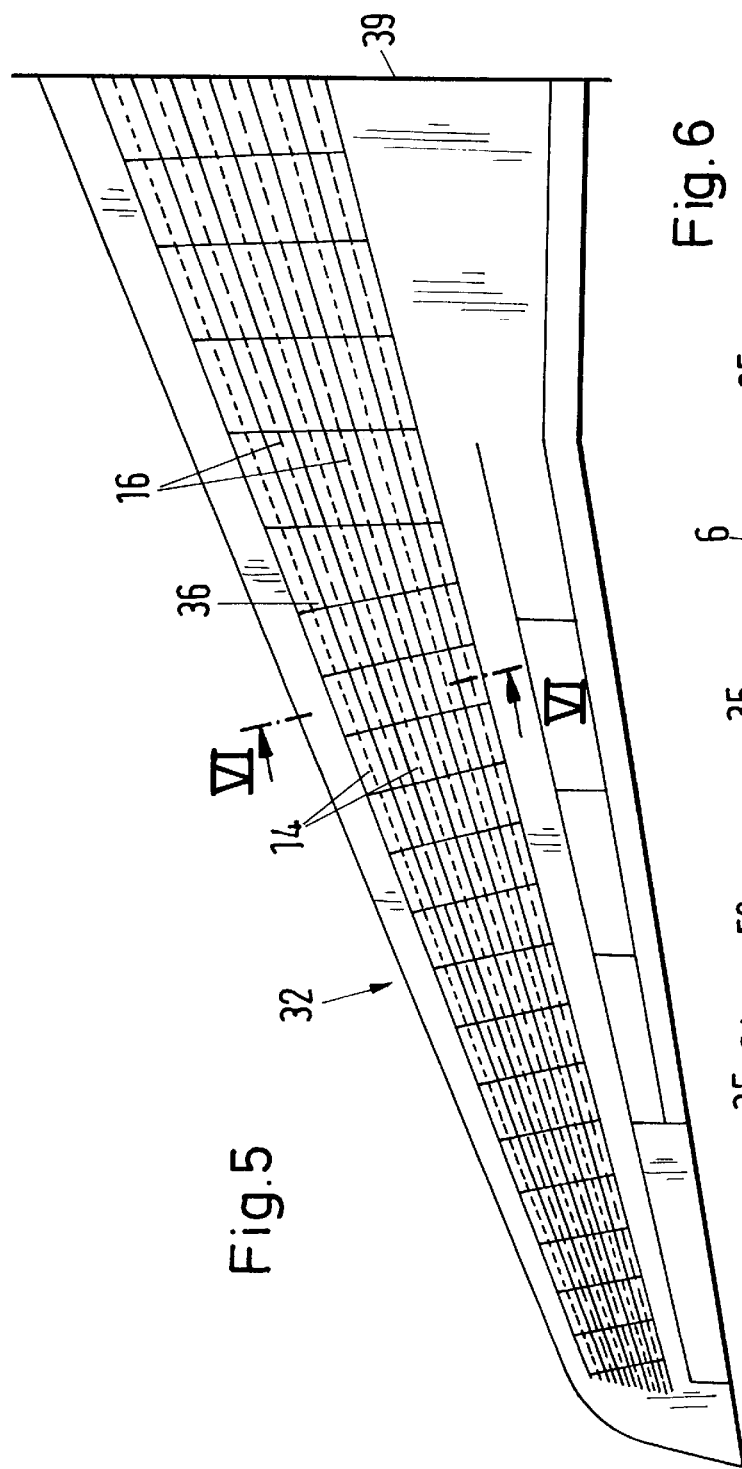
FIG. 5 is a plan view of an aircraft wing.

An aircraft wing structure 32 with stringers 34 extending longitudinally of the wing and rib supports 36 transversely thereto is shown in plan in FIG. 5. A structure of this type may be extremely long; lengths of up to 50 m are possible. The size of such wing structures is limited substantially only by the size of the available autoclaves.

Pipe elements 20 as described above with reference to FIG. 3, i.e. with cavity diameters of 8 to 10 mm, are adequate even for component lengths of this size, as the flow resistance in the cavity 24 is far less than the flow resistance of the fibre layer arrangement 12 and thus across adjacent layers. Hence uniform injection of the resin can be ensured over the whole length of the component 9 even in the case of extremely long components.

In aircraft wing elements as shown in FIG. 5 the stringers 34 are provided at substantially regular intervals, or at only slightly varying intervals if the stringers converge as in FIG. 5 with the depth of the wing profile constantly diminishing along its length towards the tip of the wing. Injection pipes 16 and vacuum pipes 14 are arranged alternately between the stringers 34 and may, for example, be taken out of the mould at the centre section 39 of the wing. In the case of very long components both ends of the pipe elements, i.e. here also the end at the tip of the wing, may be taken out of the mould and respectively connected to a resin or negative pressure source.

Figure 6:
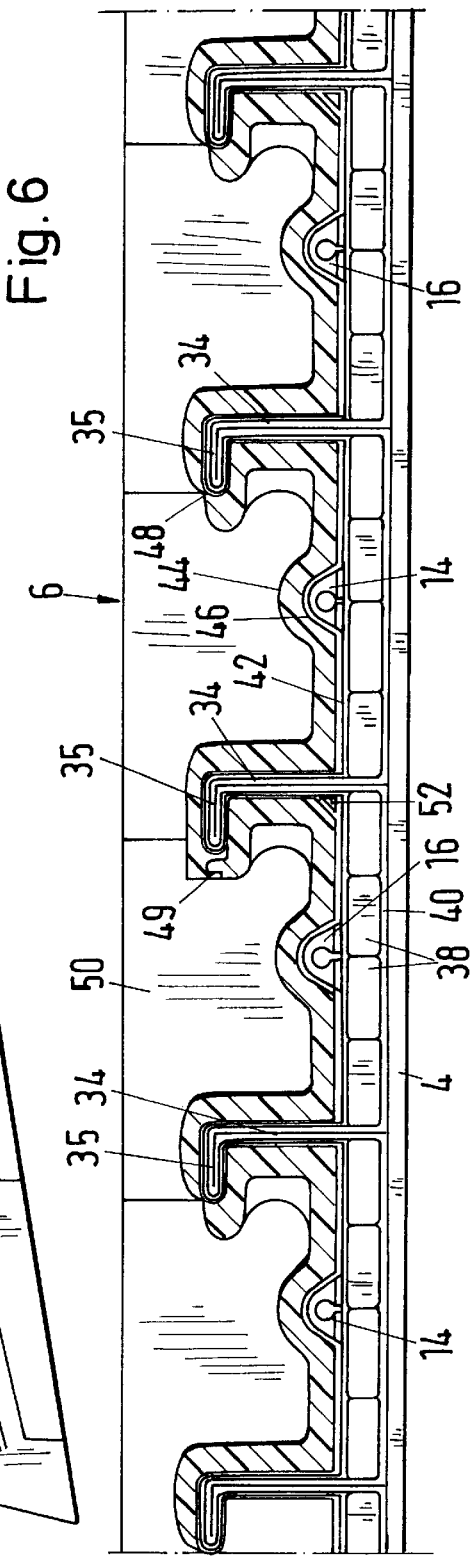
FIG. 6 is a cross-section taken along the line VI—VI in FIG. 5.

A section through a mould for making the FIG. 5 wing structure—section VI—VI in FIG. 5—is shown in FIG. 6.

The fibre layer 40 forming the torsion shell lies on the dimensionally stable mould member 4 determining the outer surface and shape of the wing element; lying on the fibre layer 40 are bundles 38 of unidirectional fibres extending longitudinally of the wing, the bundles being incorporated in the structure of the wing element in shear-resistant manner as unidirectional rigid portions by a fibre layer cover 42 lying on the opposite surface of the bundles to the fibre layer 40.

Here the resilient mould member 6 is made up of pre-shaped mould elements 44, which are shaped so as to model the internal surface of the wing shell and the surfaces of the stringers 34 and rib supports 36. This modelling is shown in the drawing, starting with the front of the angled limbs 35 of a stringer 34 and going over the surface of the limb 35 to the front of that limb 35 in the adjacent stringer 34.

Approximately midway the mould elements 44 are provided with depressions 46 in the surface facing towards the fibre layers, the depressions extending longitudinally and engaging over the pipe elements 20, whose cross-section they match. The mould elements 44 each have to be joined together in vacuum-tight manner at their edges 48. To obtain a reliable seal the elements 44 may overlap at those edges and be linked in the manner of a tongue and feather joint 49, as illustrated by way of example at the central stringer. This joint should desirably be detachable, so that the individual mould elements can be taken out successively for demoulding. When the mould elements 44 have been removed the pipe element is taken out. It can be pulled away from the surface of the component 9 by bending it, and the hardened resin in the region of the mouth of the slot 26 in the bearing surface 22 breaks off in the process.

Figure 7:
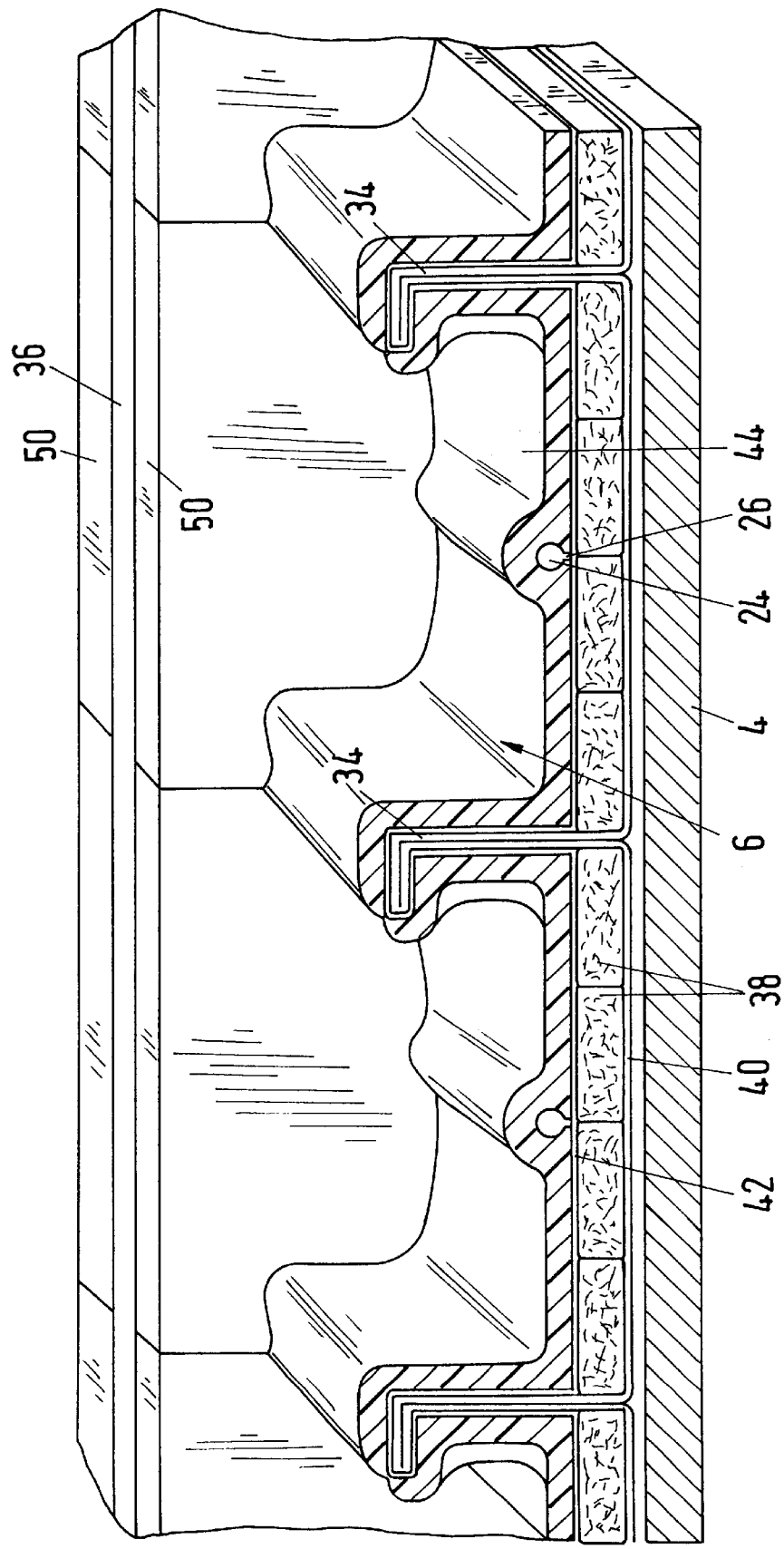
FIG. 7 is an isometric representation of a point of intersection of stringers and a rib support.

In FIG. 6 transverse walls 50 on the individual mould elements are indicated in outline. The walls 50 model the rib supports 36, as shown diagrammatically in FIG. 7. The rib supports are each modelled between two transverse walls 50 which are moulded onto adjacent elements and which may be integral with the mould elements 44 described. The wall surface facing towards the fibre layers 38, 40, 42 also contains a recess with the profile of the pipe elements, so that the pipe elements can be passed through those walls. In this way connections are formed through the rib supports, such as are required e.g. in the tank region of "wet" aircraft wings, when the pipe elements have been removed. Passages 52 may also be provided at the bottom of the stringers 34. The pipe elements shown in FIG. 6 have to be connected alternately to the vacuum-producing negative pressure source (vacuum pipe 14) and the injection pipe 16 for the resin. The resin flows transversely to the stringers and, even with very thick fibre layers as in the arrangement of unidirectional rigid portions (bundles 38), complete impregnation is guaranteed including the stringers 34 and transverse walls 50.

Where there is a plurality of mould elements of the type described above, with very long sealed areas in the resilient mould member 6, there is a risk of sporadic non-impermeable places occurring, which may cause the component 9 to be discarded. This may be prevented by resiliently covering the resilient mould member 6 and evacuating the gap between its surface and the resilient cover additionally provided. Air-conducting materials such as fibre fabric or fibre layers or wicks of fibrous material are provided for air conduction in the gap.

List of References 02 mould
03 pipe element 04 mould member
05 pipe element
06 mould member (resilient)
07 pipe element
08 bearings
09 component
10 ribs
12 fibre layer arrangement
14 vacuum pipe
16 injection pipe
17 angular straps
18 pressure vessel
19 pressure chamber
20 pipe element
22 bearing surface
24 cavity
26 slot
28 shoulders
30 section (rounded)
31 wire helix
32 aircraft wing structure
34 stringer
36 rib support
38 bundle
39 centre section of wings
40 fibre layer
42 fibre layer cover
44 mould elements
46 depression
48 edges
49 groove and feather
50 transverse walls
52 passages what is claimed is:

1. An apparatus for making large-area components from fiber composites by injecting a resin mixture into a mold with interacting mold elements between which the preformed fiber layer arrangements are inserted, one element being resiliently deformable and the other dimensionally stable, the two elements being joinable in vacuum-tight manner at their edges,
wherein the mold is provided with connections for means for injecting the resin mixture and a negative pressure source for lowering the internal pressure of the mold chamber below atmospheric,
and wherein an external pressure above atmospheric is applied to the closed mold in a pressure vessel from all sides, and the resin mixture is injected into the mold at a pressure and until cured is kept at a pressure which is lower than the external pressure acting on the mold by a difference determining the volumetric fiber content of the component,
further comprising pipe elements lying on the surface of the fiber layer arrangement opposite the dimensionally stable mold member, the pipe elements being fluidly connected to the source of resin and to the negative pressure source, the pipe elements having a length of the same order as the length or width of the large-area components and having a wide-area bearing surface, the pipe elements including a longitudinally extending cavity disposed above the bearing surface the bearing surface including a slot extending longitudinally within the cavity, the width of the slot being narrower than the diameter of the cavity.

2. The apparatus of claim 1, wherein a wire helix is provided as a supporting element in the cavity in the pipe elements, lying loosely against the wall of the cavity.

3. The apparatus of claim 1, wherein at least one end of the pipe elements is taken through between the edges of the resiliently deformable mould element and of the dimensionally stable mold member and connected to the resin feed or the negative pressure source.

4. The apparatus of claim 1, wherein a plurality of pipe elements are spaced apart and connected alternately to the negative pressure source and the means for injecting the resin mixture.

5. The apparatus of claim 1, wherein in a mold for making long components, with rib-like projections arranged on a surface and extending longitudinally of the component, the pipe elements are arranged substantially parallel with the ribs.

6. The apparatus of claim 5, wherein in the resiliently deformable mold member the ribs of the component are in the form of modeling depressions in the mold, and the fiber layer arrangements are provided with reinforcing strips for the ribs, which engage in the depressions and are joined to the arrangement.

7. The apparatus of claim 6, wherein the resiliently deformable mold member is provided with angular straps engaging in the depressions in the mold, their dimensional stability being greater than that of the resiliently deformable member.

8. The apparatus of claim 6, wherein transversely to the longitudinally extending ribs further protrusions are provided, crossing the ribs, and that the pipe elements are passed through these further protrusions, at the bottom thereof.

9. The apparatus of claim 1, wherein the pipe elements are arranged under the resiliently deformable mold member.

10. The apparatus of claim 1, wherein float valves are provided in the connecting pipe to the negative pressure source, joined to the pipe elements, the valves closing towards the negative pressure source.

11. The apparatus of claim 1, wherein a heatable autoclave is used as the pressure vessel.

12. An apparatus for making a large-area component from preformed fiber layer arrangements by injecting a resin mixture, comprising:
a mold disposed in a pressure vessel;
the mold including a first resiliently deformable mold element and a second dimensionally stable mold element, each mold element including edges joinable in a vacuum-tight manner, the mold elements defining a mold chamber for receiving a preformed fiber layer arrangement;
the pressure vessel fluidly connected to a source of superatmospheric pressure for applying superatmospheric pressure to an exterior of the mold;
a negative pressure source fluidly connected to the mold chamber for lowering the internal pressure of the mold chamber below atmospheric; and
a means for injecting the resin mixture fluidly connected to the mold chamber;
a first and a second pipe element in direct contact with the fiber layer arrangement, each pipe element having a length that is the same as the length or width of the large-area component, each pipe element having a wide-area bearing surface and including a longitudinally extending cavity and a longitudinally extending slot fluidly connecting the cavity to the mold chamber, the width of the slot being narrower than the width of the cavity; and
wherein the first pipe element is fluidly connected to the means of injecting the resin mixture and the second pipe element is fluidly connected to the negative pressure source.

* * * * *